(12) United States Patent
Matsuda

(10) Patent No.: US 6,824,436 B2
(45) Date of Patent: Nov. 30, 2004

(54) PERSONAL WATERCRAFT

(75) Inventor: Yoshimoto Matsuda, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/213,699

(22) Filed: Aug. 6, 2002

(65) Prior Publication Data
US 2003/0036320 A1 Feb. 20, 2003

(30) Foreign Application Priority Data

Aug. 17, 2001 (JP) ........................................ 2001-247783

(51) Int. Cl.[7] .............................................. F01M 13/00
(52) U.S. Cl. ..................... 440/88 A; 123/572
(58) Field of Search ............................ 440/88 A, 88 R; 123/572, 41.86, 573, 574

(56) References Cited

U.S. PATENT DOCUMENTS

| 4,345,573 A | * | 8/1982 | Obata .......................... 123/572 |
| 4,381,755 A | * | 5/1983 | Caracciolo ............. 123/568.11 |
| 5,239,972 A | * | 8/1993 | Takeyama et al. .......... 123/573 |
| 5,501,202 A | * | 3/1996 | Watanabe .................... 123/572 |
| 6,022,252 A | * | 2/2000 | Ozawa ...................... 440/88 R |
| 6,029,638 A | * | 2/2000 | Funai et al. ................. 123/572 |
| 6,044,828 A | * | 4/2000 | Matsushita .................. 123/572 |
| 6,190,221 B1 | * | 2/2001 | Nanami ..................... 440/88 R |
| 6,298,836 B1 | * | 10/2001 | Werner ....................... 123/572 |
| 6,491,556 B2 | * | 12/2002 | Muramatsu et al. ...... 440/88 R |

* cited by examiner

Primary Examiner—Andrew Wright
(74) Attorney, Agent, or Firm—Kolisch Hartwell, PC

(57) ABSTRACT

Disclosed is a personal watercraft capable of preventing oil flow from an engine to a breather device. The personal watercraft comprises: a four-cycle engine; a water jet pump driven by the engine, the water jet pump pressurizing and accelerating water taken in from outside of the watercraft and ejecting the water from the outlet port to propel the watercraft as a reaction of the ejecting water; a breather pipe configured such that a base end is connected to the engine to communicate with an inside of the engine, an intermediate portion is located lower than the base end, and a tip end is located higher than the base end; and a breather box, wherein the tip end of the breather pipe communicates with inside of the breather box and the base end of the breather pipe is located lower than the breather box.

13 Claims, 11 Drawing Sheets

PERSONAL WATERCRAFT

BACKGROUND OF THE INVENTION

1. Field of the Invention

The present invention relates to a jet-propulsion personal watercraft (PWC) which ejects water rearward and planes on a water surface as the resulting reaction. More particularly, the present invention relates to a breather device mounted in an engine.

2. Description of the Related Art

In recent years, so-called jet-propulsion personal watercraft have been widely used in leisure, sport, rescue activities, and the like. The jet-propulsion personal watercraft is configured to have a water jet pump that pressurizes and accelerates water sucked from a water intake generally provided on a bottom of a hull and ejects it rearward from an outlet port. Thereby, the personal watercraft is propelled.

In the jet-propulsion personal watercraft, a steering nozzle provided behind the outlet port of the water jet pump is swung either to the right or to the left, to change the ejection direction of the water to the right or to the left, thereby turning the watercraft to the right or to the left.

In recent years, the use of a four-cycle engine in the jet-propulsion personal watercraft has been contemplated.

When the four-cycle engine is mounted in the personal watercraft, there is a need for a breather device because a volume of a crank case varies with reciprocation of pistons.

In the four-cycle engine, an inner space of the crank case communicates with an inner space of a cylinder head of the engine through a cam chain tunnel or the like. The breather device allows the inner space of the cylinder head to communicate with the outside of the engine through a breather pipe. Or, the breather device allows an inner space of the crank case to communicate with the outside of the engine through the breather pipe. The breather device serves to release a pressure in the crank case resulting from the reciprocation of the pistons to the outside of the engine.

When releasing the pressure inside of the crank case to the outside, the breather device functions to prevent leakage of the oil mist, included in the released air (blow-by gas), to the ambient side.

The breather device needs to function so as to prevent the oil flow from the engine to the ambient side even when the watercraft is inverted.

Meanwhile, since the personal watercraft is commonly used on the water and often splashed with water, regular maintenance such as application of oil is necessary for smooth movement of movable mechanical elements of a throttle device provided in an intake pipe or movable mechanical elements of an air-intake port.

SUMMARY OF THE INVENTION

The present invention addresses the above-described condition, and an object of the present invention is to provide a personal watercraft capable of preventing oil flow from an oil reservoir to outside even when the watercraft is inverted. Another object of the present invention is to provide a personal watercraft capable of suitably supplying oil from a breather device to movable mechanical elements of a throttle device provided in an intake passage or movable mechanical elements of an air-intake port.

According to the present invention, there is provided a personal watercraft comprising: a four-cycle engine; a water jet pump driven by the engine, the water jet pump pressurizing and accelerating water taken in from outside of the watercraft and ejecting the water from the outlet port to propel the watercraft as a reaction of the ejecting water; a breather pipe configured such that a base end is connected to the engine to communicate with an inside of the engine, an intermediate portion is located lower than the base end, and a tip end is located higher than the base end; and a breather box, wherein the tip end of the breather pipe communicates with the inside of the breather box and the base end of the breather pipe is located lower than the breather box.

In the personal watercraft so constituted, while the watercraft is not moving or cruising under an engine-running condition, air-containing oil (oil mist) flows from the engine toward the breather box above the engine and is liquefied in the breather box. On the other hand, when the watercraft is inverted, the intermediate portion of the breather pipe is located higher than the base end of the breather pipe communicating with the engine. Therefore, flow of the oil from the engine toward the breather box can be prevented.

It is preferable that the base end of the breather pipe is connected to a breather pipe connecting port provided in a cylinder head of the engine.

It is preferable that the breather pipe has a branch portion at a position lower than the base end, and the branch portion communicates with the inside of a crank case of the engine through an oil return pipe. Thereby, the liquefied oil reserved in the breather pipe can be returned to the engine. This is optimal to the engine, including the oil reservoir provided at the bottom of the crank case of the engine.

It is preferable that the breather pipe has a branch portion at a position lower than the base end, and the branch portion communicates with inside of an oil tank for reserving engine oil through an oil return pipe. Thereby, the liquefied oil reserved in the breather pipe can be returned to the oil tank. This is optimal to the engine of a dry sump type in which the oil tank is provided independently of the engine.

According to the present invention, there is further provided a personal watercraft comprising: a four-cycle engine; a water jet pump driven by the engine, the water jet pump pressurizing and accelerating water taken in from outside of the watercraft and ejecting the water from the outlet port to propel the watercraft as a reaction of the ejecting water; an air-intake passage provided for the engine and provided with an air-intake box; a breather box provided in the air-intake passage and including an oil inlet communicating with inside of the engine; a communicating passage through which inside of the breather box communicates with the air-intake passage; and a breather pipe through which the oil inlet of the breather box communicates with inside of the engine.

In the personal watercraft so constituted, while the watercraft is not moving or cruising under the engine-running condition, oil mist can be supplied from the breather box into the air-intake passage through the communicating passage. The breather box may be provided in the air-intake box or at a different position in the intake passage. Also, by providing the air-intake passage over the cylinder head, the length of the air-intake passage can be extended. Consequently, an engine with a good inertia effect for air-intake is attained.

It is preferable that an inlet of the communicating passage is located as high as or lower than the oil inlet. Thereby, even when the watercraft is inverted, it is possible to prevent the oil reserved in the breather box from flowing toward the intake passage.

It is preferable that the breather pipe is configured such that the base end is located lower than the breather box, the tip end communicates with the inside of the breather box and is located higher than the base end, and an intermediate portion is located lower than the base end.

The personal watercraft may further comprise: an oil return port provided in the breather box; a breather return pipe through which the oil return port communicates with an oil reservoir; and a first baffle wall provided between the oil inlet and the inlet of the communicating passage in the breather box, the first baffle wall extending downwardly from a ceiling wall of the breather box, such that a lower end of the baffle wall is located lower than an imaginary line connecting an upper end of the oil inlet to the inlet of the communicating passage so as to form a space allowing the oil inlet and the inlet of the communicating passage to communicate with each other below the lower end of the first baffle wall.

In the personal watercraft so constituted, while the watercraft is not moving or cruising under the engine-running condition, the oil mist flows through the space below the first baffle wall so as to be supplied from the breather box into the air-intake passage through the communicating passage, and the oil liquefied and separated in the breather box can be returned from the oil return port to the oil reservoir. On the other hand, when the watercraft is inverted, the first baffle wall serves to prevent the oil reserved in the breather box from flowing into the air-intake passage.

The personal watercraft may further comprise: a second baffle wall provided between the oil inlet and the inlet of the communicating passage, the second baffle wall extending vertically from a bottom wall of the breather box, such that an upper end of the second baffle wall is located higher than the imaginary line connecting the upper end of the oil inlet to the inlet of the communicating passage so as to form a space allowing the oil inlet and the inlet of the communicating passage to communicate with each other above the upper end of the second baffle wall. With such a constitution, the oil mist flows above the second baffle wall or above the second baffle wall and below the first baffle wall so as to be supplied from the breather box into the air-intake passage. On the other hand, when the watercraft is inverted, the second baffle wall or the first baffle wall and the second baffle wall serve to prevent the oil reserved in the breather box from flowing into the air-intake passage.

It is preferable that the oil return port is located lower than the oil inlet.

It is preferable that a throttle body to control air flow in the air-intake passage is contained in the air-intake box so that part of oil in the breather box is supplied to the throttle body through the communicating passage.

The personal watercraft may further comprise an oil return port provided in the breather box; a breather return pipe through which the oil return port communicates with an oil reservoir; and a porous plate provided inside of the breather box, for permitting flow of oil between the oil inlet and the inlet of the communicating passage. As defined herein, the porous plate includes plates through which communication is made between the oil inlet and the inlet of the communicating passage, such as a mesh plate or a punching plate.

In the personal watercraft so constituted, while the watercraft is not moving or cruising during engine running, the oil mist passes through holes of the porous plate so as to be supplied from the breather box into the intake passage through the communicating passage, and the oil separated in the breather box can be returned from the oil return port into the oil reservoir. On the other hand, when the watercraft is inverted, the oil reserved in the breather box can be effectively prevented from flowing into the intake passage because of the presence of the porous plate. Against the inversion of the watercraft, the porous plate may be configured to have an upper portion having no holes, for the purpose of more effectively preventing the oil flow into the intake passage.

It is preferable that the breather box is integrally provided at a bottom of the air-intake box and the communicating passage is formed in a separating wall that defines the air-intake box and the breather box.

It is preferable that the breather box is integrally provided inside of the air-intake box and the communicating passage is formed in a separating wall that defines the air-intake box and the breather box. This provides a simplified constitution.

It is preferable that the oil return port is located lower than the oil inlet. Thereby, while the watercraft is not moving or cruising during engine running, the oil reserved in the breather box can be quickly returned to the oil reservoir, for example, to the oil tank or oil reserving portion at the lower portion of the crank case, through the breather return pipe.

It is preferable that a throttle body to control air flow in the air-intake passage is contained in the air-intake box so that part of oil in the breather box is supplied to the throttle body through the communicating passage. Thereby, the oil mist can be supplied to the element outside of the throttle body, for example, to a movable mechanical element such as the throttle mechanism, outside of the throttle body, for lubricating the element. As a matter of course, the oil mist can be supplied to the inside of the throttle body through the opening of the throttle body, thereby lubricating the movable mechanical element.

The above and further objects and features of the invention will be more fully be apparent from the following detailed description with accompanying drawings.

DETAILED DESCRIPTION OF THE PREFERRED EMBODIMENTS

Hereinafter, a personal watercraft which is one type of a jet-propulsion watercraft according to an embodiment of the present invention will be described with reference to the accompanying drawings.

Figure 4:
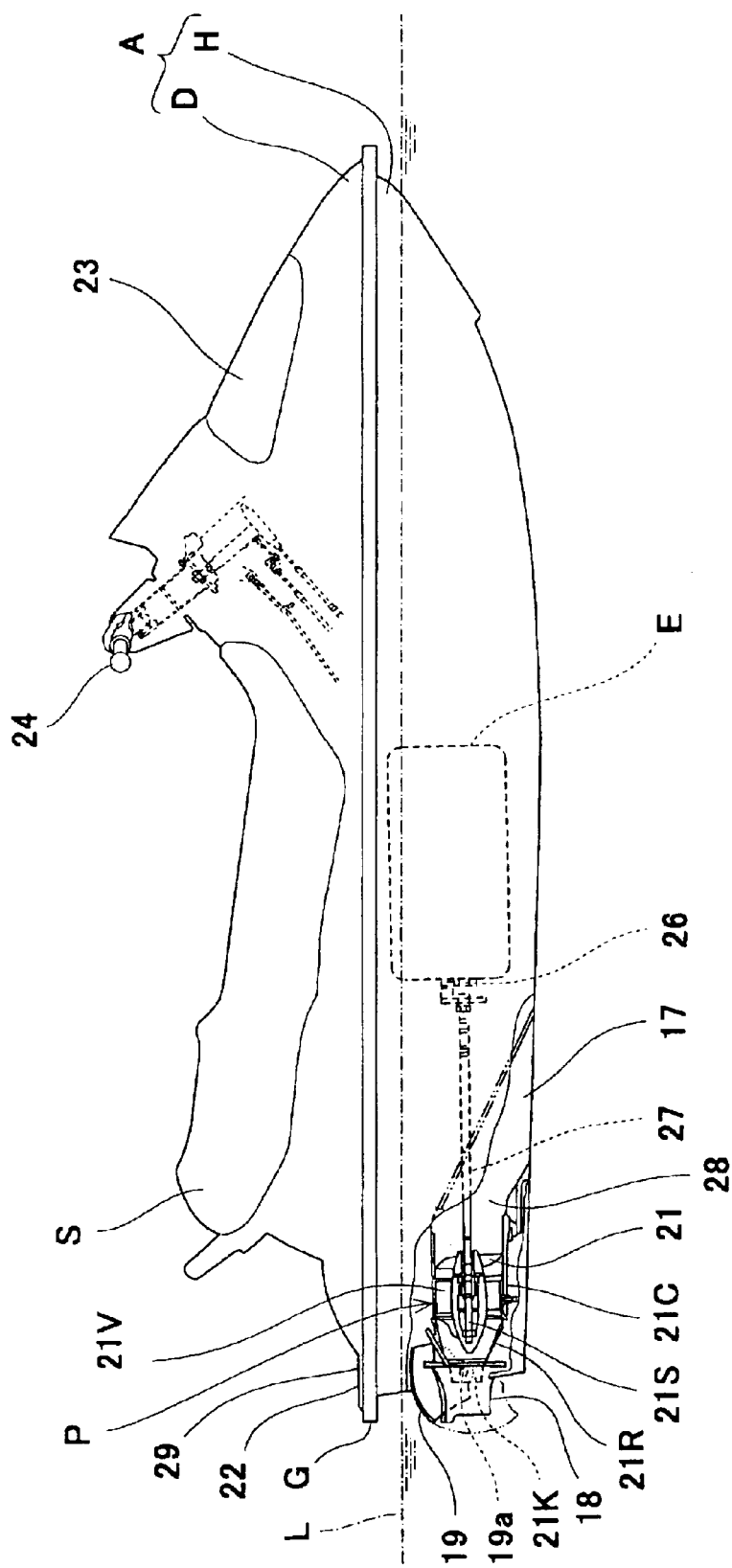
FIG. 4 is a side view showing an entire jet-propulsion personal watercraft according to the embodiment of the present invention.
Figure 5:
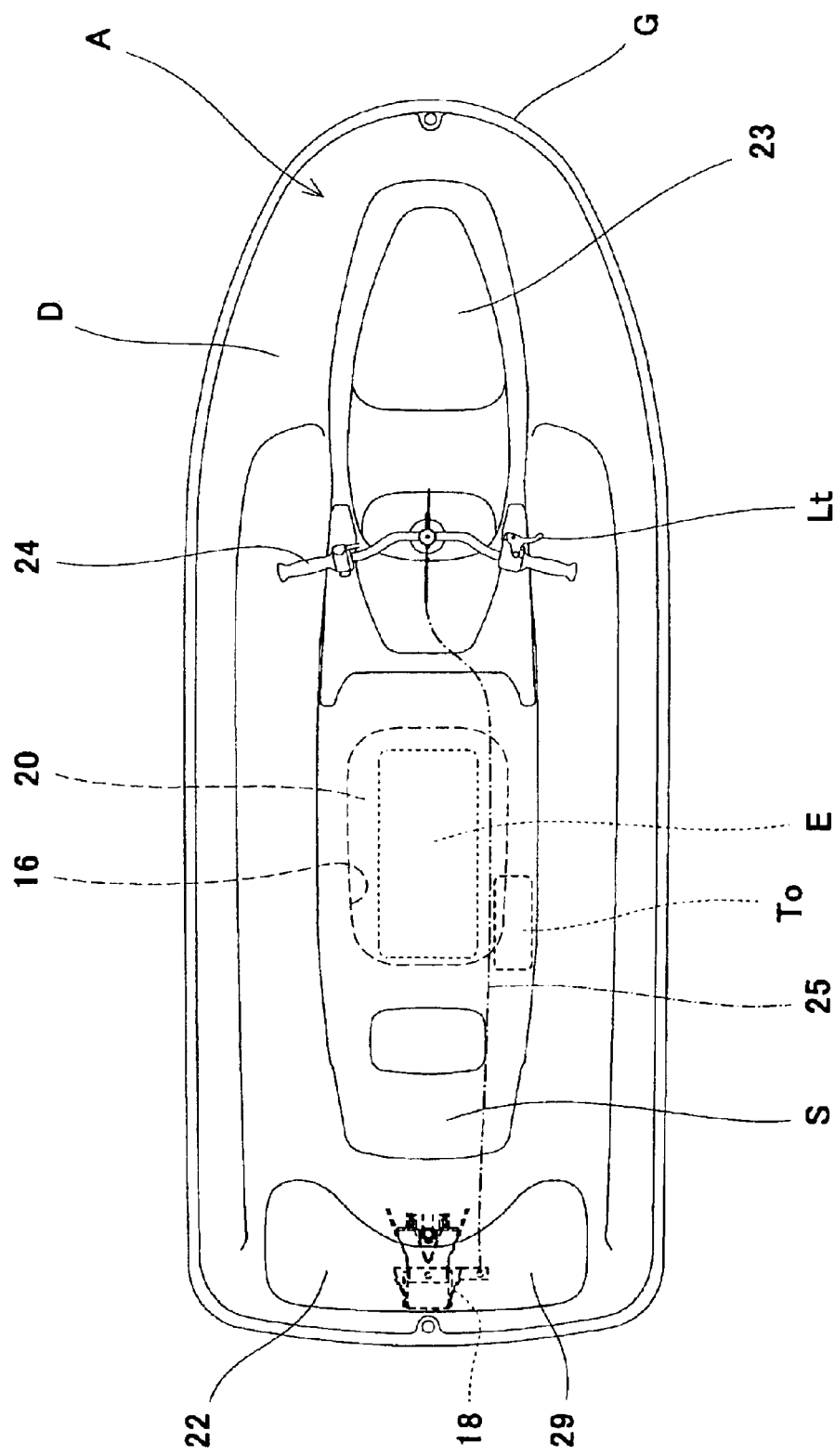
FIG. 5 is a plan view showing the entire personal watercraft in FIG. 4.

In FIGS. 4, 5, reference numeral A denotes a body of the personal watercraft. The body A comprises a hull H and a deck D covering the hull H from above. A line at which the hull H and the deck D are connected over the entire perimeter thereof is called a gunnel line G. In this embodiment, the gunnel line G is located above a waterline L of the personal watercraft.

As shown in FIG. 5, an opening 16, which has a substantially rectangular shape seen from above, is formed at a relatively rear section of the deck D such that it extends in the longitudinal direction of the body A. As shown in FIGS. 4, 5, a riding seat S is provided over the opening 16.

An engine E is provided in a chamber (engine room) 20 surrounded by the hull H and the deck D below the seat S.

The engine E is a four-cycle engine of a multi-cylinder (e.g., four-cylinder) dry sump type. As shown in FIG. 4, a crankshaft 26 of the engine E is mounted along the longitudinal direction of the body A. An output end of the crankshaft 26 is rotatably coupled integrally with a pump shaft 21S of a water jet pump P through a propeller shaft 27. An impeller 21 is attached to the pump shaft 21S of the water jet pump P. The impeller 21 is covered with a pump casing 21C on the outer periphery thereof. A water intake 17 is provided on the bottom of the hull H. The water is sucked from the water intake 17 and fed to the water jet pump P through a water intake passage 28. The water jet pump P pressurizes and accelerates the water by rotation of the impeller 21. The pressurized and accelerated water is discharged through a pump nozzle 21R having a cross-sectional area of flow gradually reduced rearward, and from an outlet port 21K provided on the rear end of the pump nozzle 21R, thereby obtaining the propulsion force.

Figure 6:
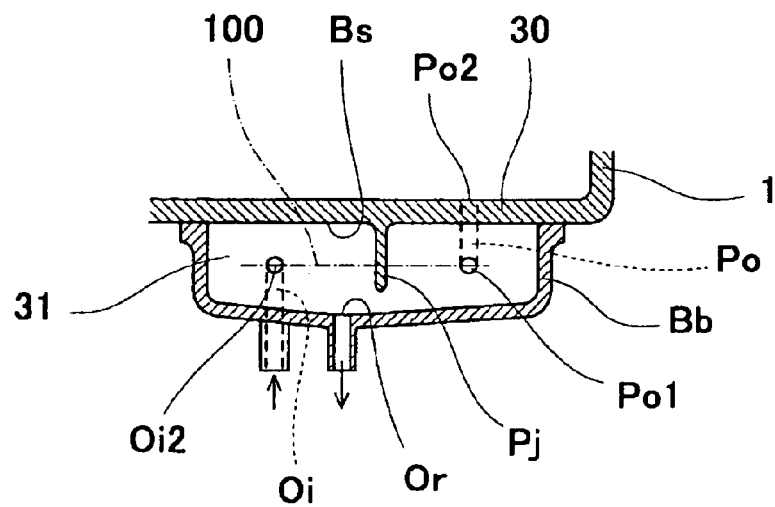
FIG. 6 is a partially enlarged cross-sectional view showing another structure of the breather box.

In FIG. 4, reference numeral 21V denotes fairing vanes for fairing water flow behind the impeller 21. As shown in FIGS. 4, 5, reference numeral 24 denotes a bar-type steering handle. The handle 24 operates in association with a steering nozzle 18 swingable around a swing shaft (not shown) to the right or to the left behind the pump nozzle 21R. When the rider rotates the handle 24 clockwise or counterclockwise, the steering nozzle 18 is swung toward the opposite direction so that the watercraft can be correspondingly turned to any desired direction while the water jet pump P is generating the propulsion force. As shown in FIG. 6, the handle 24 is provided with a throttle lever Lt for controlling an engine speed of the engine E in the vicinity of a right grip.

As shown in FIG. 4, a bowl-shaped reverse deflector 19 is provided above the rear side of the steering nozzle 18 such that it can swing downward around a horizontally mounted swinging shaft 19a. The deflector 19 is swung downward to a lower position behind the steering nozzle 18 to deflect the ejected water from the steering nozzle 18 forward, and as the resulting reaction, the personal watercraft moves rearward.

In FIGS. 4, 5, reference numeral 22 denotes a rear deck. The rear deck 22 is provided with an openable rear hatch cover 29. A rear compartment (not shown) with a small capacity is provided under the rear hatch cover 29. In FIG. 4 or 5, reference numeral 23 denotes a front hatch cover. A front compartment (not shown) is provided under the front hatch cover 23 for storing equipments and the like. In FIG. 5, To denotes an oil tank provided independently of the engine E, for reserving oil for engine lubrication.

Figure 1:
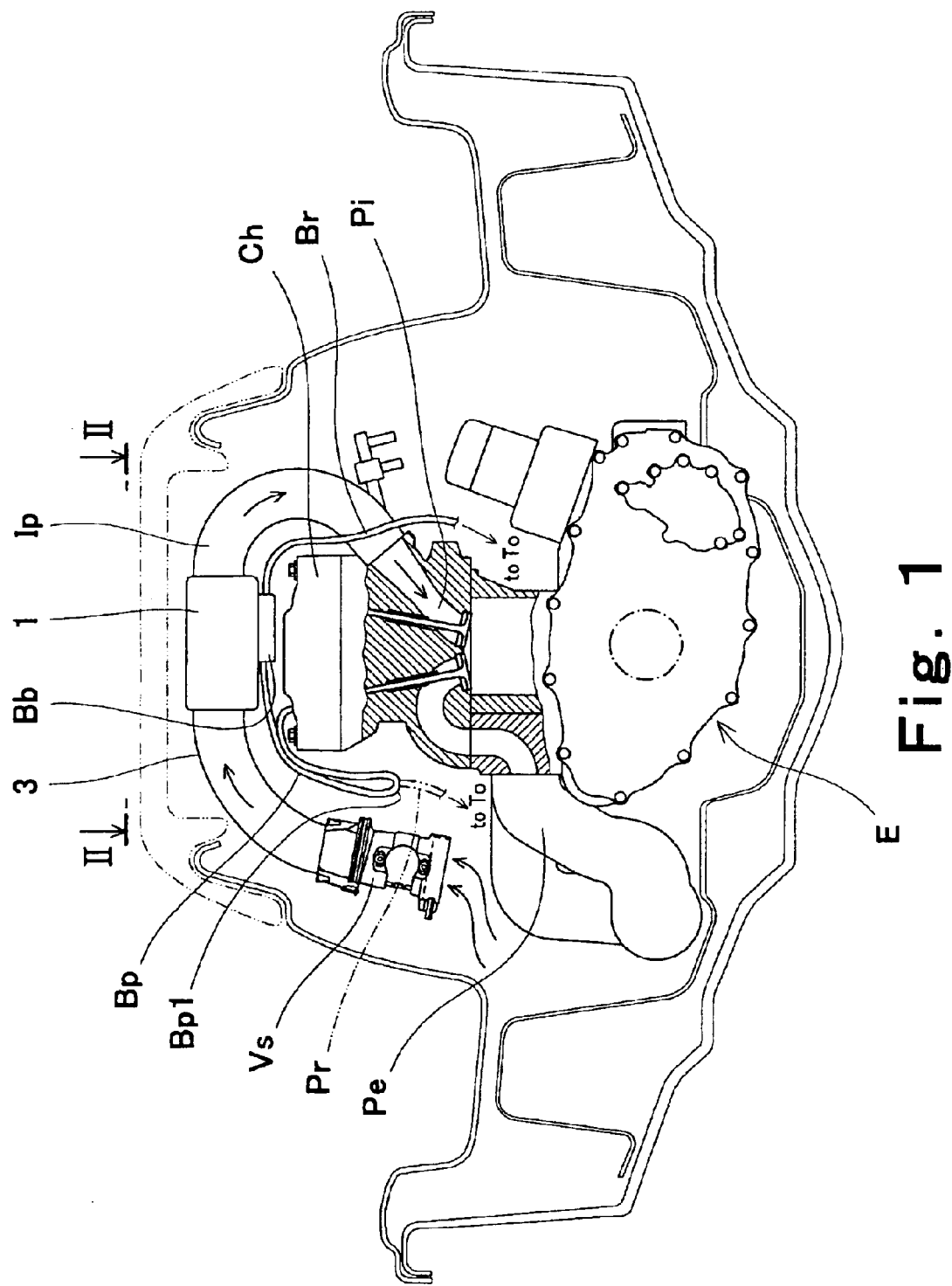
FIG. 1 is a cross-sectional view showing an engine, an air-intake box above the engine, and a breather box provided in the air-intake box, of a personal watercraft according to an embodiment of the present invention, which is sectioned along the direction orthogonal to the longitudinal direction of the watercraft.
Figure 2:
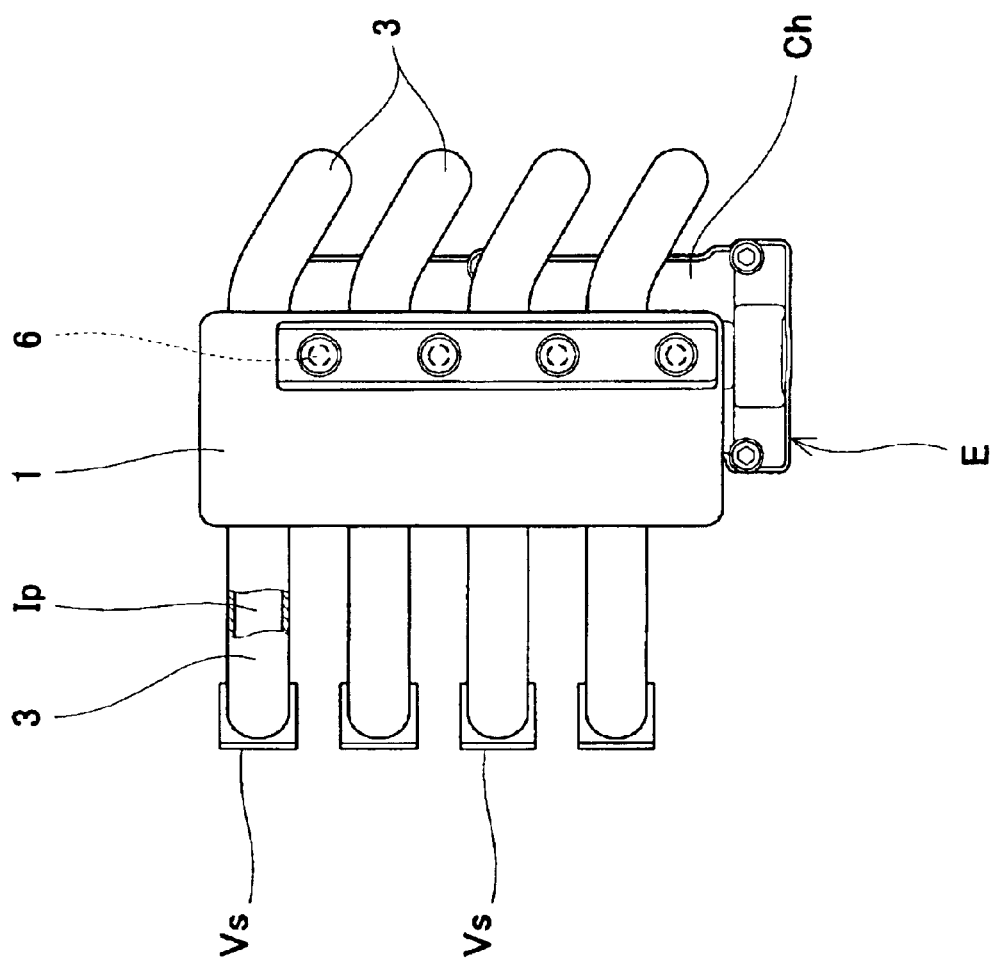
FIG. 2 is a plan view taken in the direction of arrows substantially along line II—II in FIG. 1.

As shown in FIGS. 1, 2, in the personal watercraft according to the embodiment of the present invention, air-intake passages Ip is positioned over a cylinder head Ch of the engine E. As shown in FIGS. 1, 2, an air-intake box (air filter box) 1 is provided in the air-intake passages Ip (in this embodiment, at an intermediate position of the air-intake passage Ip). As shown in FIG. 2, the air-intake box 1 overlies ignition plugs 6 arranged on the cylinder head Ch of the engine E. To be precise, as shown in FIG. 2, the air-intake box 1 somewhat deviates from the cylinder head Ch toward an exhaust pipe Pe (see FIG. 1) and toward the rear of the watercraft (upper side in FIG. 2).

Intake pipes 3 respectively constitute the air-intake passages Ip of the engine E. The intake pipes 3 are configured such that their tip ends are respectively connected to throttle bodies Vs and their base ends respectively extend to corresponding intake ports Pi formed in the cylinder head Ch of the engine E. When the throttle bodies Vs are at an open position, clean air in the air-intake box 1 is supplied to the intake port Pi of each cylinder head Ch.

Each of the throttle bodies Vs is capable of changing air flow volume in each air-intake pipe Ip (or intake port Pi) by the operation of corresponding throttle valve (not shown). The throttle valve is connected to a throttle lever Lt provided in the vicinity of a right grip of the handle 24 in FIG. 5 through an operation cable or wire (not shown). By operating the throttle lever Lt, the throttle valve of the throttle body Vs is operated, thereby controlling the engine speed power.

Figure 3:
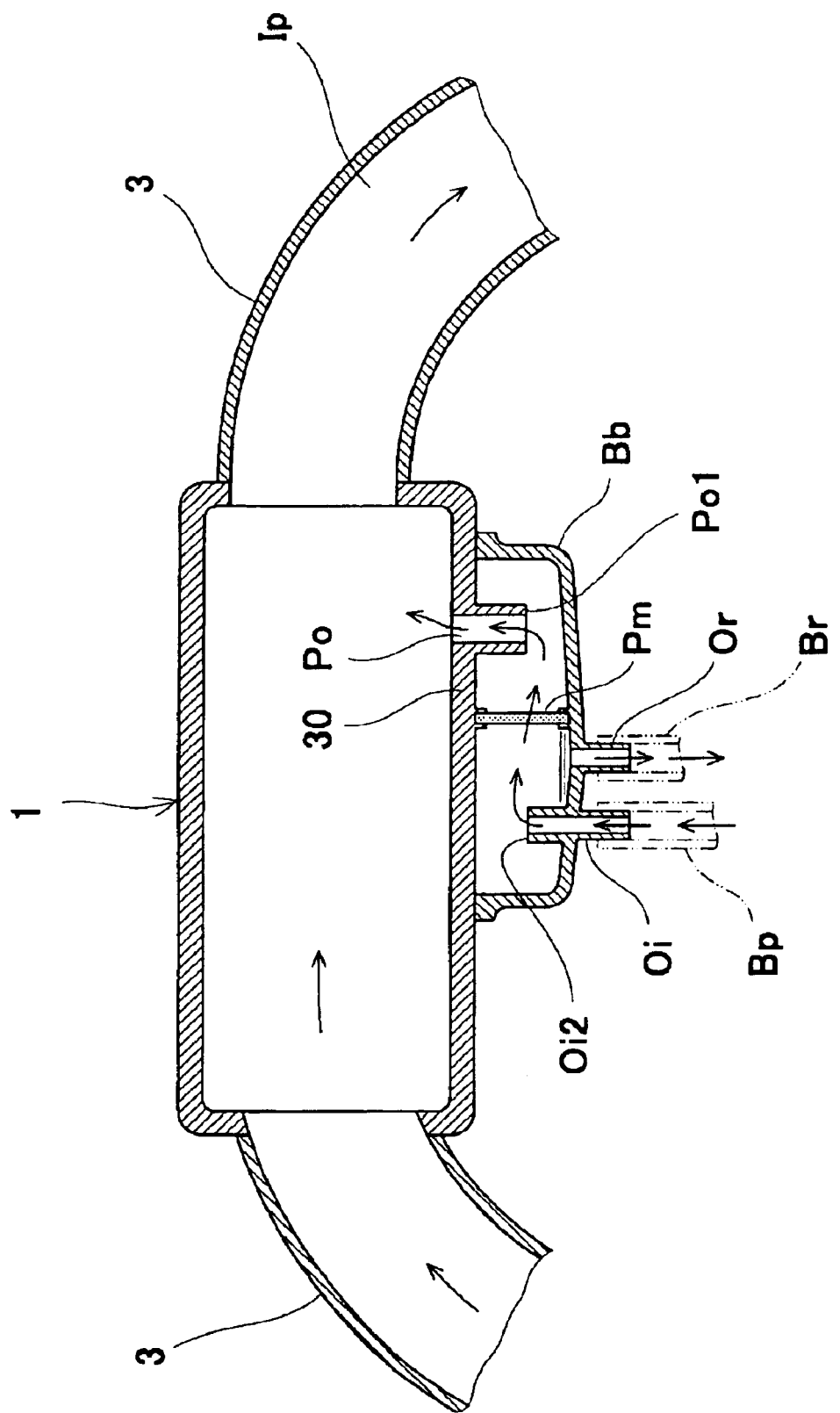
FIG. 3 is a partially enlarged sectional view of a structure of the air-intake box and the breather box in FIG. 1.

As shown in FIGS. 1, 3, a breather box Bb is provided integrally with the bottom of the air-intake box 1.

As shown in FIG. 1, the breather box Bb is connected to a breather pipe connecting port on the engine E side through a breather pipe Bp. For example, the connecting port is provided in the cylinder head Ch of the engine E. As shown in FIG. 3, the breather box Bb is provided with an oil inlet Oi, and a tip end of the breather pipe Bp is connected to the oil inlet Oi. The breather box Bb is further provided with an oil return port Or such that the upper end of the oil return port Or is lower than the upper end of the oil inlet Oi. As shown in FIG. 3, a base end of a breather return pipe Br is connected to the oil return port Or. The breather return pipe Br connects the breather box Bb to the oil tank To (see FIG. 5) as the engine oil reservoir, as shown in FIG. 1. It should be appreciated that, when the engine E is not of a dry sump type, a tip end of the breather return pipe Br is connected to the oil reserving portion at the bottom of the crank case of the engine E.

As shown in FIG. 1, the breather pipe Bp is entirely substantially U-shaped. In other words, the breather pipe Bp is configured such that an intermediate portion of the breather pipe Bp is lower than a base end portion of the breather pipe Bp connected to the engine E (cylinder head Ch), for example, the breather pipe connecting port at the upper end portion of the cylinder head Ch, and a tip end of the breather pipe Bp is connected to the breather box Bb located higher than the base end portion connected to the engine E.

Further, as shown in FIG. 3, a communicating passage Po is provided between the breather box Bb and the air-intake box 1 to allow oil mist in the breather box Bb to be supplied into the air-intake box 1 (intake passage) through the communicating passage Po.

As shown in FIG. 3, a lower end Po1 corresponding to an inlet of the communicating passage Po is opened downwardly at a position as high as or lower than an upper end Oi2 of the oil inlet Oi. In the embodiment in FIG. 3, the lower end Po1 of the communicating passage Po is located as high as the upper end Oi2 of the oil inlet Oi.

A porous plate, for example a mesh plate Pm, is provided between the communicating passage Po and the oil inlet Oi. The lower end Po1 communicates with the oil inlet Oi through the mesh plate Pm. In this structure, the oil return port Or is provided on the side of the oil inlet Oi with respect to the mesh plate Pm.

Figure 7:
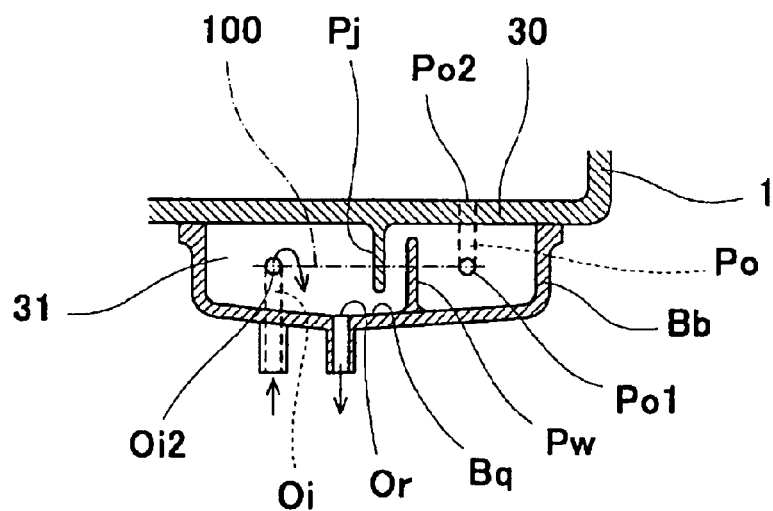
FIG. 7 is a partially enlarged cross-sectional view showing another structure of the breather box.
Figure 8:
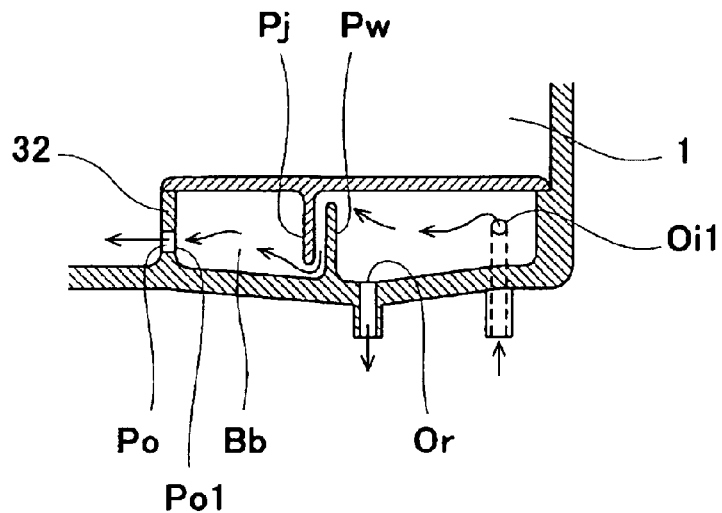
FIG. 8 is a partially enlarged cross-sectional view showing another structure of the breather box.
Figure 9:
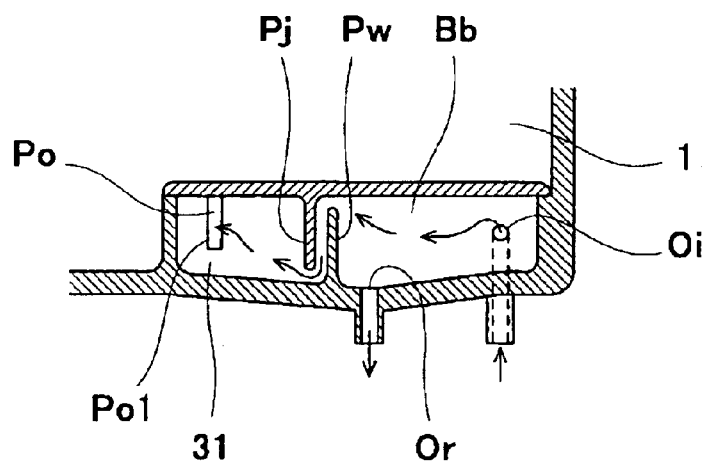
FIG. 9 is a partially enlarged cross-sectional view showing another structure of the breather box.

Alternatively, as shown in FIG. 6, a first baffle wall Pj may be provided between the communicating passage Po and the oil inlet Oi such that the wall Pj extends downwardly from a ceiling wall Bs of the breather box Bb. The lower end of the first baffle wall Pj is located lower than an imaginary line 100 connecting the lower end Po1 of the communicating passage Po to the upper end Oi2 of the oil inlet Oi, and the inlet Po1 of the communicating passage Po communicates with the oil inlet Oi through a space below the first baffle wall Pj. As shown in FIGS. 7–9, a second baffle wall Pw may be vertically provided on a bottom surface Bq of the breather box Bb, adjacently to the first baffle wall Pj. The upper end of the second baffle wall Pw is located higher than the imaginary line 100 connecting the lower end Po1 of the communicating passage Po to the upper end Oi2 of the oil inlet Oi, and the inlet Po1 of the communicating passage Po communicates with the oil inlet Oi through a space above the second baffle wall Pw. Thus, the provision of the first baffle wall Pj and the second baffle wall Pw between the communicating passage PO and the oil inlet Oi creates a labyrinth structure.

As shown in FIG. 3, the communicating passage Po may vertically penetrate a separating wall 30 provided to define the air-intake box 1 and the breather box Bb. Alternatively, the following configurations are possible. i) As shown in FIGS. 6, 7, the lower end Po1 of the communicating passage Po may be opened in a side wall 31 of the breather box Bb and an upper end Po2 thereof may be opened in an upper surface of the separating wall 30. ii) As shown in FIG. 8, when the breather box Bb is contained in a corner portion of the air-intake box 1, a hole may transversely penetrate a side wall 32 of the breather box Bb as the communicating passage Po. iii) As shown in FIG. 9, when the breather box Bb is contained in the corner portion of the air-intake box 1, the communicating passage Po of a vertically long rectangle shape may transversely penetrate the side wall 31 of the breather box Bb in the direction orthogonal to the cutaway surface.

In the personal watercraft so constituted, during engine running, the oil mist is introduced from the inside of the cylinder head Ch of the engine E into the breather box Bb through the breather pipe Bp, and part of the oil mist flows into the air-intake box 1 (air-intake passage) through the communicating passage Po. The oil mist is supplied to the movable mechanical elements of the throttle valve and the intake port, or the like, for lubricating them.

During such lubrication, even in the case where the throttle valve is located in the air-intake passage Ip upstream of the air-intake box 1 as shown in FIG. 1, the oil mist is supplied to the throttle valve because the air intake is temporarily blown back when the intake valve of the engine E is closed.

Since the mesh plate Pm, or the first or second baffle walls Pj, Pw are provided inside of the breather box Bb, the oil mist makes contact with these walls and is liquefied. Then, the liquefied oil is returned from the oil return port Or into the oil tank To as the oil reservoir through the breather return pipe Br in the dry sump-type engine, or into the oil-reserving portion at the bottom of the crank case of the engine E in the engine other than the dry sump-type engine. In this structure, the oil is supplied by a feed pump from the oil tank To (or oil-reserving portion) into the portions requiring lubrication of the engine such as bearing portion, contact portion between the piston and the cylinder, and contact portion between a cam and a cam follower, through an oil filter.

On the other hand, when the watercraft is inverted, the oil does not flow from the engine E to the breather box Bb through the breather pipe Bp because of the above U-shaped configuration of the breather pipe Bp. As described above, the mesh plate Pm or the first baffle wall Pj is provided inside of the breather box Bb or, otherwise, the labyrinth structure comprised of the first baffle wall Pj and the second baffle wall Pw is provided in the breather box Bb. Further, the communicating passage Po is located as high as or lower than the oil inlet Oi. For these reasons, the oil reserved at the bottom of the breather box Bb is prevented from flowing from the breather box Bb toward the air-intake passage Ip.

Figure 10:
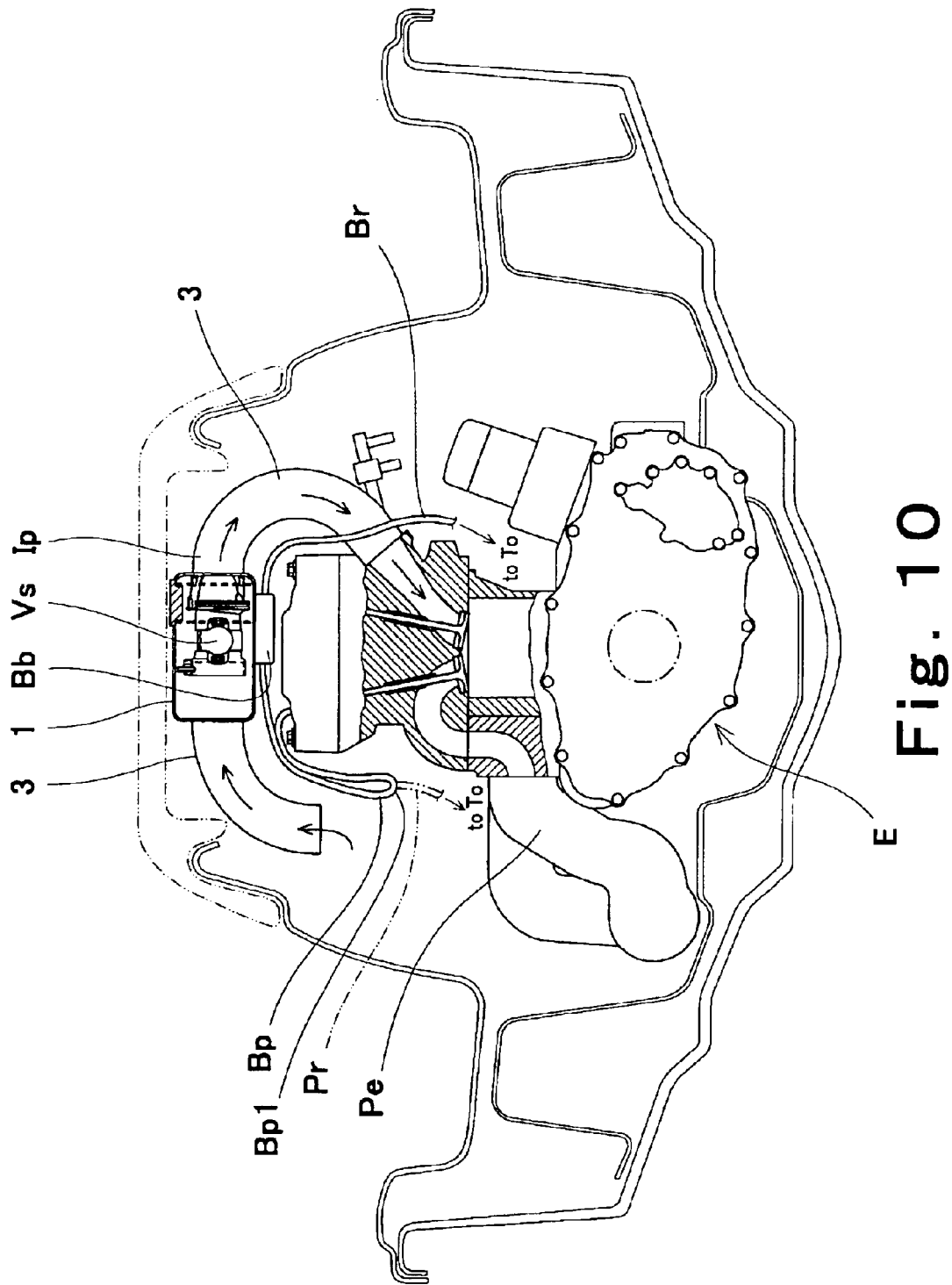
FIG. 10 is a cross-sectional view showing that a throttle body is contained in the air-intake box of the personal watercraft according to another embodiment of the present invention, which is sectioned along the direction orthogonal to the longitudinal direction of the watercraft.

As shown in FIG. 10, the throttle body Vs may be contained in the air-intake box 1. In that case, the oil mist flows from the breather box Bb into the air-intake box 1 and is supplied into the air-intake passage Ip through the opening in the throttle body Vs. Simultaneously, the elements outside of the throttle body Vs requiring lubrication are lubricated by the oil mist outside of the throttle body Vs. In this manner, uniform lubrication is effected. Further, in the structure in FIG. 10, because the throttle body Vs is enclosed by the air-intake box 1, the throttle body Vs is not splashed with water even when the seat S is removed. In FIG. 10, the same reference numerals as those in FIG. 1 are used to indicate the same or corresponding parts.

Figure 11:
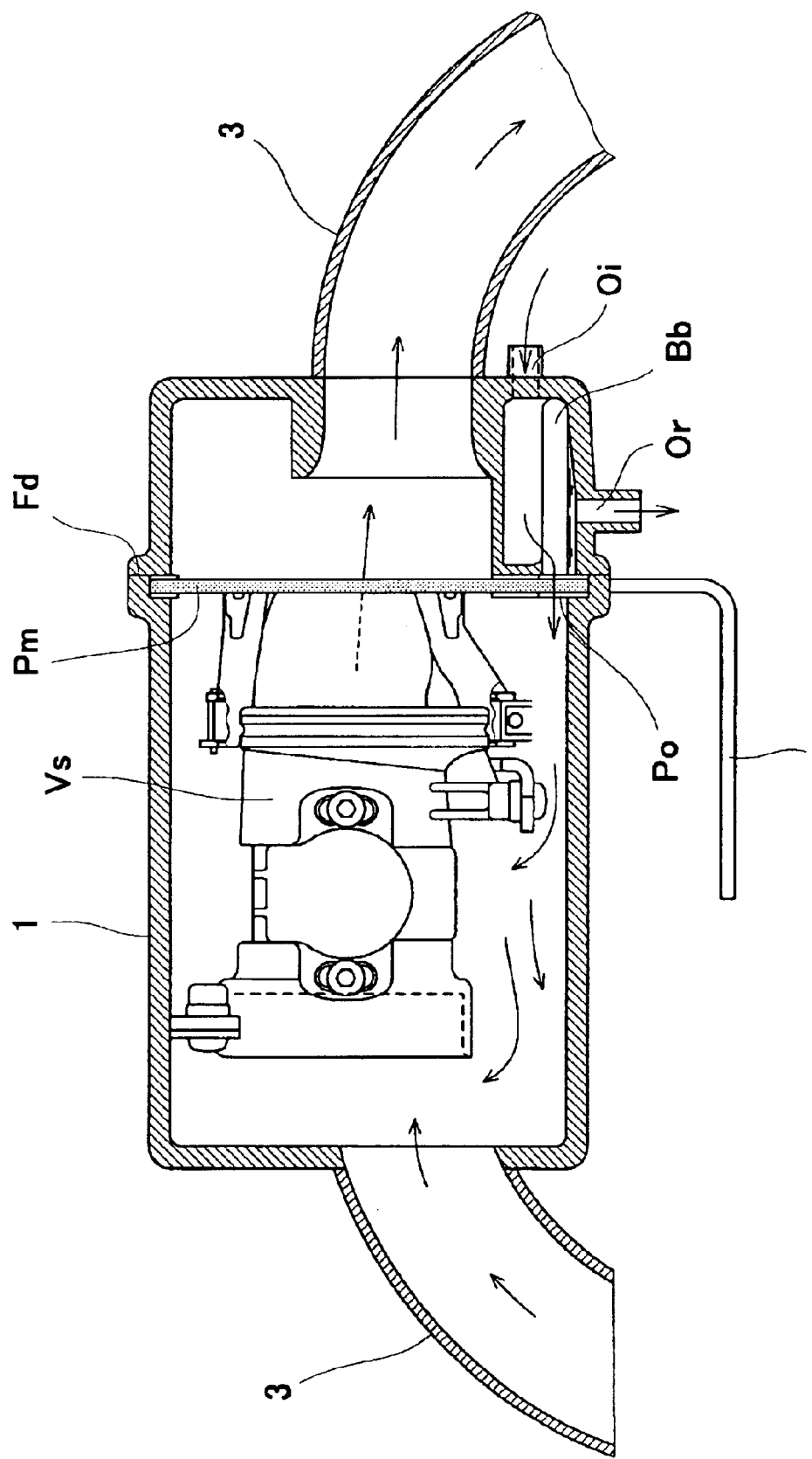
FIG. 11 is a partially enlarged cross-sectional view showing an internal structure of the air-intake box in FIG. 10.
Figure 12:
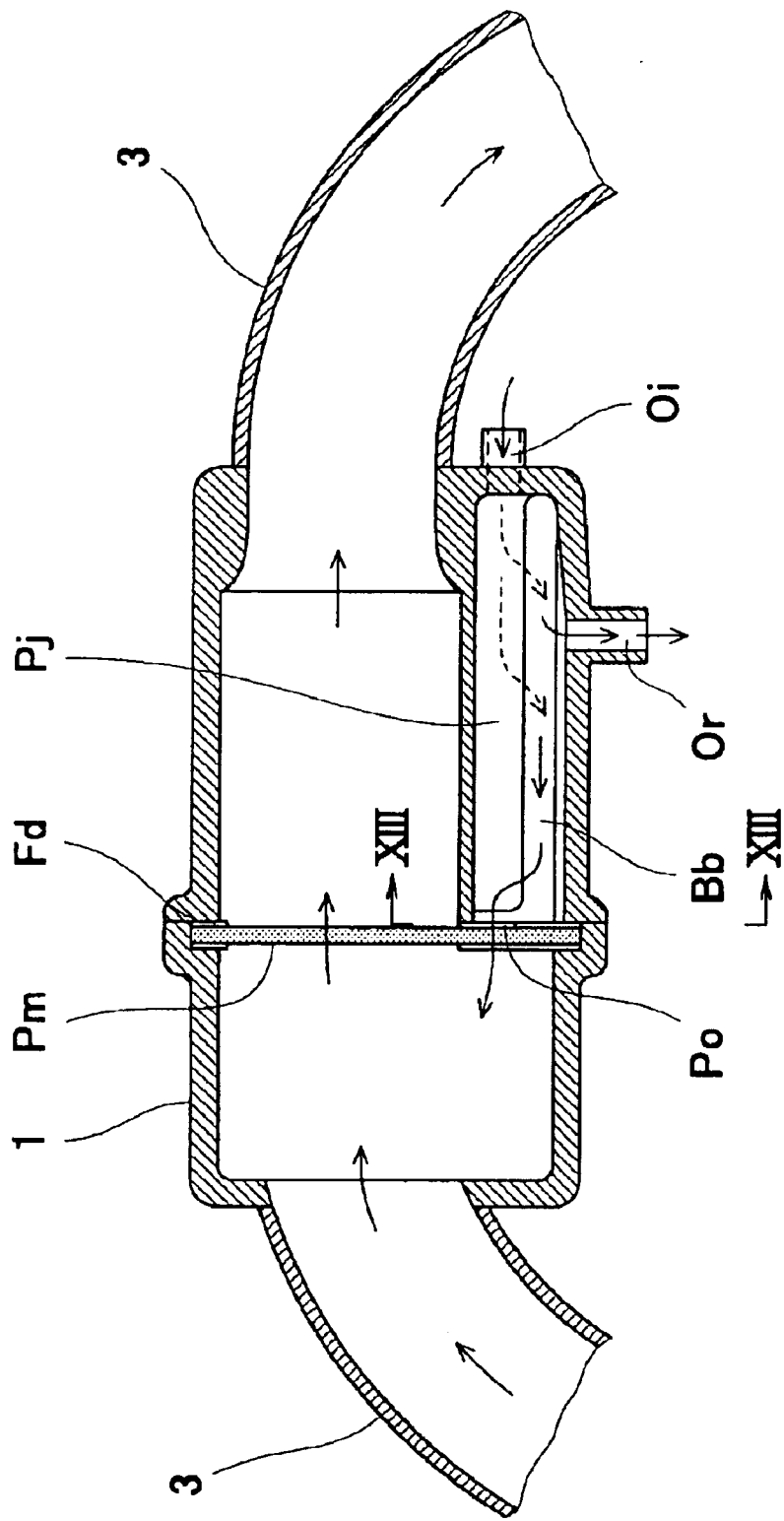
FIG. 12 is a partially enlarged view showing another internal structure of the air-intake box.

Similarly to the embodiment in FIG. 1, as shown in FIGS. 11, 12, the communicating passage Po may be located as high as or lower than the oil inlet Oi of the breather box Bb. Or, a baffle wall may be provided between the oil inlet Oi and the communicating passage Po. In FIGS. 11, 12, the same reference numerals as those in FIG. 1 are used to indicate the same or corresponding parts, and Pm denotes a mesh plate.

Figure 13:
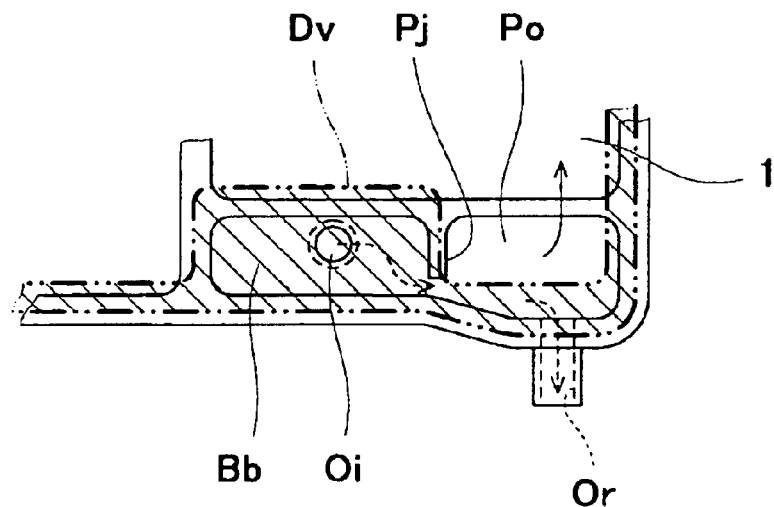
FIG. 13 is a partially enlarged view taken in the direction of arrows substantially along line XIII—XIII in FIG. 12, showing a structure of a connecting face between the air-intake box and the breather box in FIG. 12, and a separating wall provided on the connecting face to define the air-intake box and the breather box.
Figure 14:
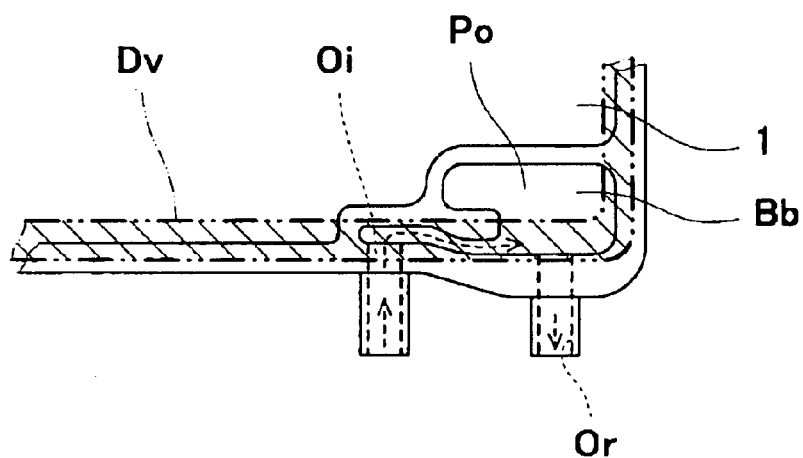
FIG. 14 is a partially enlarged view showing another structure of the connecting face between the air-intake box and the breather box, and the separating wall provided thereon.

As shown in FIGS. 11, 12, the air-intake box 1 containing the breather box Bb, may be divided into two parts such that a connecting face Fd between them is orthogonal to the intake passage. In this case, the connecting face Fd defines the breather box Bb and the air-intake box 1. As shown in FIG. 13, a separating wall Dv having a communicating passage Po through which the breather box Bb communicates with the air-intake box 1 is provided on the connecting face Fd, thereby defining the breather box Bb and the air-intake box 1. In this structure, assembly and replacement of parts such as the separating wall Dv, and cleaning of the inside of these boxes are easily carried out. The structure in FIG. 13 may be replaced by the wall Dv having the communicating passage Po in FIG. 14. In FIGS. 13, Pj denotes the baffle wall. In FIG. 11, Bk denotes a bracket member through which the air-intake box 1 is mounted to the cylinder head Ch of the engine E.

In the above embodiment, the breather box is provided in the air-intake box. Alternatively, the breather box may be provided in the intake pipe, for directly supplying the oil mist from the breather box into the intake pipe.

As indicated in FIGS. 1, 10 by the dashed lines formed by alternating long dashes and two short dashes, a branch portion Bp1 is provided at the lower portion of the U-shaped breather pipe Bp and the oil return pipe Pr is connected to the branch portion Bp1 to allow the liquefied oil in the breather pipe Bp to be returned to the engine E or the oil tank To as the oil reservoir.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A personal watercraft comprising:
   a four-cycle engine;
   a water jet pump driven by the engine, the water jet pump pressurizing and accelerating water taken in from outside of the watercraft and ejecting the water from the outlet port to propel the watercraft as a reaction of the ejecting water;
   an air-intake passage provided for the engine and provided with an air-intake box;
   a breather box attached to the air-intake box as a chamber separate from the air-intake box, the breather box including an oil inlet communicating with an inside of the engine and an oil return port;
   a communicating passage through which the inside of the breather box communicates with the air-intake passage;
   a breather pipe through which the oil inlet of the breather box communicates with the inside of the engine; and
   a breather return pipe through which the oil return port communicates with an oil reservoir.

2. The personal watercraft according to claim 1, wherein an inlet of the communicating passage extends downwardly from an upper face of the breather box to protrude into the breather box,
   the oil inlet extends upwardly from a bottom face of the breather box to protrude into the breather box, and
   a lower end of the inlet of the communicating passage is located as high as or lower than the oil inlet.

3. The personal watercraft according to claim 1, wherein the breather pipe is configured such that a base end connected to the engine to communicate with the inside of the engine is located lower than the breather box, a tip end connected to the breather box to communicate with the inside of the breather box is located higher than the base end, and an intermediate portion is located lower than the base end.

4. The personal watercraft according to claim 1, further comprising:
   a first baffle wall provided between the oil inlet and an inlet of the communicating passage in the breather box, the first baffle wall extending downwardly from a ceiling wall of the breather box, such that a lower end of the baffle wall is located lower than an imaginary line connecting an upper end of the oil inlet to the inlet of the communicating passage so as to form a space allowing the oil inlet and the inlet of the communicating passage to communicate with each other below the lower end of the first baffle wall.

5. The personal watercraft according to claim 4, further comprising: a second baffle wall provided between the oil inlet and the inlet of the communicating passage, the second baffle wall extending vertically from a bottom wall of the breather box, such that an upper end of the second baffle wall is located higher than the imaginary line connecting the upper end of the oil inlet to the inlet of the communicating passage so as to form a space allowing the oil inlet and the inlet of the communicating passage to communicate with each other above the upper end of the second baffle wall.

6. The personal watercraft according to claim 4, wherein the oil return port is located lower than the oil inlet.

7. The personal watercraft according to claim 4, wherein a throttle body to control air flow in the air-intake passage is contained in the air-intake box so that oil mist in the breather box is supplied to the throttle body through the communicating passage.

8. The personal watercraft according to claim 1, further comprising:
   a porous plate provided inside of the breather box, for permitting flow of oil between the oil inlet and an inlet of the communicating passage.

9. The personal watercraft according to claim 8, wherein the breather box is integrally provided inside of the air-intake box and the communicating passage is formed in a separating wall that defines the air-intake box and the breather box.

10. The personal watercraft according to claim 8, wherein the oil return port is located lower than the oil inlet.

11. The personal watercraft according to claim 8, wherein a throttle body to control air flow in the air-intake passage is contained in the air-intake box so that oil mist in the breather box is supplied to the throttle body through the communicating passage.

12. A personal watercraft comprising:
    a four-cycle engine;
    a water jet pump driven by the engine, the water jet pump pressurizing and accelerating water taken in from outside of the watercraft and ejecting the water from the outlet port to propel the watercraft as a reaction of the ejecting water;
    an air-intake passage provided for the engine and provided with an air-intake box;
    a breather box provided in the air-intake passage, and including an oil inlet communicating with an inside of the engine and an oil return port;
    a communicating passage through which the inside of the breather box communicates with the air-intake passage;
    a breather pipe through which the oil inlet of the breather box communicates with the inside of the engine;
    a breather return pipe through which the oil return port communicates with an oil reservoir; and a porous plate provided inside of the breather box, for permitting flow of oil between the oil inlet and an inlet of the communicating passage, wherein the breather box is integrally provided at a bottom of the air-intake box and the communicating passage is formed in a separating wall that defines the air-intake box and the breather box.

13. A Personal watercraft comprising:

a four-cycle engine;

a water jet pump driven by the engine, the water jet pump pressurizing and accelerating water taken in from outside of the watercraft and ejecting the water from the outlet port to propel the watercraft as a reaction of the ejecting water;

an air-intake passage provided for the engine and provided with an air-intake box;

a breather box provided in the air-intake passage, and including an oil inlet communicating with an inside of the engine and an oil return port;

a communicating passage through which the inside of the breather box communicates with the air-intake passage;

a breather pipe through which the oil inlet of the breather box communicates with the inside of the engine;

a breather return pipe through which the oil return port communicates with an oil reservoir, wherein the breather pipe has a branch portion at a position lower than a base end connected to the engine to communicate with the inside of the engine, and the branch portion communicates with the oil reservoir of the engine through the oil return pipe.

* * * * *